Figure 1:
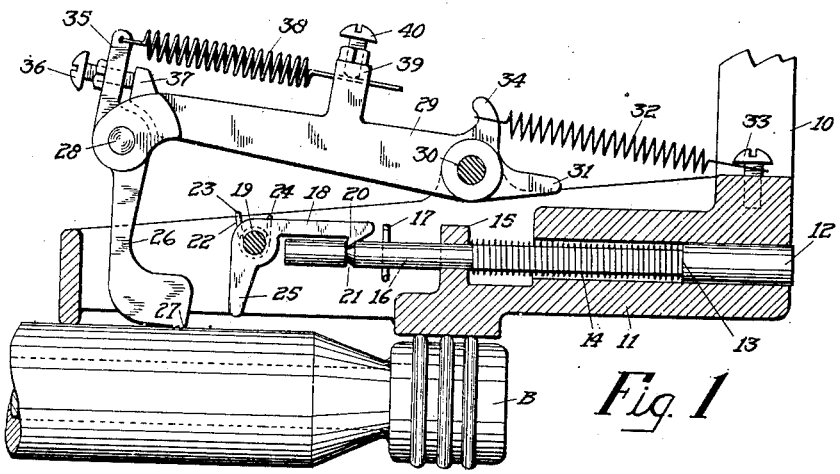

March 13, 1928.  R. G. TURNER  1,662,219
WEFT DETECTOR MOUNTED ON REGULARLY MOVING TRANSFERRERS
Filed Aug. 6, 1926

Inventor
Richard G. Turner
Attorneys

Patented Mar. 13, 1928.

1,662,219

UNITED STATES PATENT OFFICE.

RICHARD GREENLEAF TURNER, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

WEFT DETECTOR MOUNTED ON REGULARLY-MOVING TRANSFERRERS.

Application filed August 6, 1926. Serial No. 127,694.

This invention relates to improvements in weft detectors which are located in regularly moving transferrer arms for weft replenishing looms, and it is the principal object of the invention to render more certain the action of a side slipping weft detector which derives its operative movement from the inertia thereof.

In copending application, Serial #120,491 there is shown a weft detector mounted on a carrier lever pivoted to a transferrer arm which receives a movement toward the bobbin on detecting beats of the loom. The lever and detector are normally raised but as the transferrer arm comes to a sudden stop in its descent the energy stored in the detector and lever tends to keep these parts in motion and they move toward the surface to be detected.

In the first experiment which I made with this type of detector employing a side slip detector I used a comparatively light spring to return the detector to normal position and a somewhat heavier spring to hold the carrier lever in its normally raised position. With such a construction the detector shows a tendency to rebound away from the surface being detected and to move into improper contact with the latch which retains the indicating plunger in inoperative position.

When the transferrer arm comes to rest the inertia force of the detector and carrier lever must be considerably stronger than the force of the spring which holds them in raised position so that they can move with certainty toward the bobbin. As these parts descend part of their inertia force is counteracted by the spring attached to the carrier, the inertia force growing less and less as the carrier lever and detector approach the bobbin. At the time the detector engages the yarn the remaining inertia force will tend to cause the detector to move along the bobbin, this movement being resisted at all times by the detector spring and on non-indicating detecting beats of the loom by the yarn also.

It is further an object of my invention to choose a detector spring which will exert a force almost but not quite equal to the remaining inertia force of the detector and carrier lever so that there will not be sufficient excess of force to cause rebounding and the detector will remain in sliding contact with the bobbin, thus insuring a continuous contact with the weft and avoiding the objectionable rebounding.

With these and other objects in view which will appear as the description proceeds, my invention resides in the combination and arrangement of parts hereinafter described and set forth in the claim.

Figure 2:
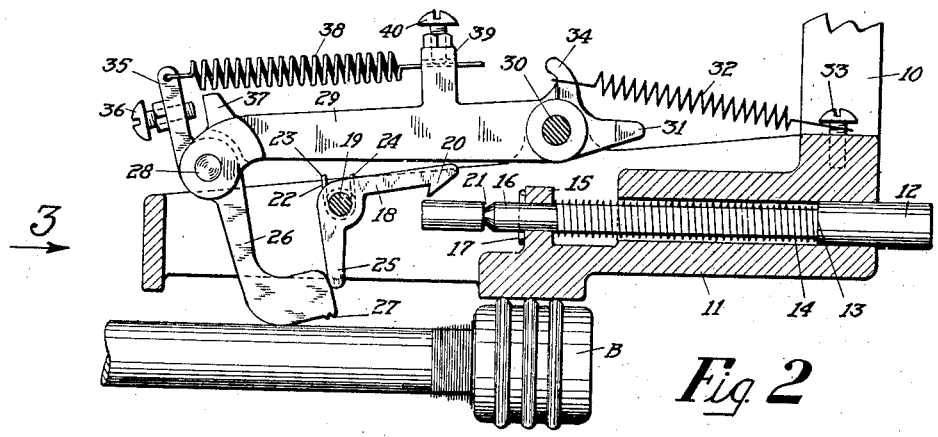
Figure 3:
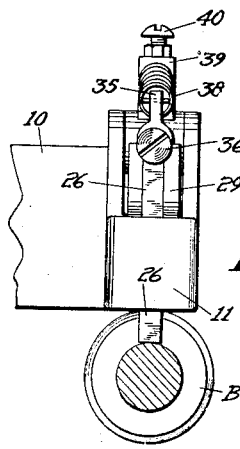

In the accompanying drawings, wherein I have shown one form of my invention,

Fig. 1 is a vertical longitudinal section thru that part of the transferrer arm which extends above and parallel to the bobbin when the latter is in detecting position, showing the detector in contact with a full bobbin, Fig. 2 is a view similar to Fig. 1 but with the detector in contact with a substantially exhausted bobbin and moved to indicating position, and Fig. 3 is an end elevation taken in the direction of arrow 3, Fig. 2.

Referring to the drawings it will be seen that I have provided a transferrer arm 10 having a portion 11 extending above and parallel to the bobbin B and having slidably mounted therein a plunger 12 formed with a shoulder 13 which receives the right hand thrust of a compression spring 14 as seen in Figs. 1 and 2. The left hand end of spring 14 bears against the web 15 thru which extends a reduced shank 16 of the plunger 12. Pin 17 is passed thru the shank and limits right hand movement of the plunger under action of the spring.

The mechanism for normally holding plunger 12 in the inoperative position in Fig. 1 comprises a latch 18 pivoted on a pin 19 mounted in the transferrer arm. Said latch has a hook 20 which is held in a notch 21 formed in the shank 16 by a torsion spring 22, one end of which as indicated at 23 extends over a part of the portion 11 and the other end as indicated at 24 extends over the latch 18, the intermediate portions being coiled around stud or pin 19. Said latch is provided with a depending arm 25 moved to the right from the position shown in Fig. 1 at the time of indication of substantial weft exhaustion to release the plunger.

The detector 26 has a curved yarn engaging toothed surface 27 and is pivoted as at 28 to a lever 29 which in turn is pivotally mounted for free movement on a stud 30 secured to the transferrer arm. Said lever 29 has a tail 31 which normally engages that portion of the transferrer arm which serves as a housing for the plunger 12, being held in this position by a tension spring 32 one end of which is held by a screw 33 and the other end of which is caught on a finger 34 formed integrally with lever 29.

The detector 26 has an upwardly projecting arm 35 provided with a stop screw 36 placed to engage a boss 37 formed on lever 29 for the purpose of properly locating the detector. The upper end of arm 35 receives one end of a relatively heavy tension spring 38, the right hand end of which is held adjustable in a lug 39 by screw 40.

In operation the transferrer arm 10 is moved downwardly toward the bobbin B on detecting beats of the loom by mechanism not shown but set forth in Patent #1,372,316 to Ryon. Lever 29 is held yieldingly in raised position by comparatively light spring 32 during said downward motion, but when the transferrer arm comes to rest the energy stored in the lever 29 and detector will cause them to continue downwardly toward the bobbin to effect contact between the detector and the bobbin. If sufficient weft is present the teeth 27 will prevent movement of the detector along the bobbin, but if insufficient weft is present the detector will slide along the bare bobbin because of the fact that the teeth 27 are out of vertical alignment with the pivot 28. The detector will move into engagement with the arm 25 to rock the latch 18 in a counter-clockwise direction to the position shown in Fig. 2 against the action of relatively heavy spring 38. The hook 20 will therefore be moved out of notch 21 and spring 14 will move the plunger to the right to the position indicated in Fig. 2, which, as set forth in my aforesaid patent, corresponds to indication of weft exhaustion to the replenishing mechanism.

As previously stated it is found that by having spring 38 relatively heavy the detector can be kept in contact with the surface being detected and rebounding and consequently improper or premature indication be avoided.

From the foregoing it will be seen that I have provided a weft detector for a regularly moving transferrer arm wherein the spring which holds the weft detector in normal position exerts a force almost equal to the inertia force of the descending detector and carrier lever, the effect of this relation being to cause the detector to remain in contact with the detected surface and thus avoid rebounding.

Having thus described my invention it will be apparent that changes and modifications may be made therein by those skilled in the art without departing from the spirit and scope of the invention and I do not wish to be limited to the details herein disclosed, but what I claim is:

In a weft detector mechanism for a loom having a transferrer arm moved toward and arrested in its motion toward the surface to be detected on detecting beats of the loom, a side slip weft detector, a carrier for the detector pivotally mounted on the transferrer arm and movable toward the surface to be detected when the transferrer is arrested in its movement towards the surface to be detected by reason of the inertia of said detector and carrier, yielding means to hold the carrier and detector in raised position, other yielding means to hold the detector in normal position relatively to the carrier, said first yielding means exerting a force considerably less than the inertia force of the detector and carrier and said second yielding means exerting a force only slightly less than the inertia force of the carrier.

In testimony whereof I have hereunto affixed my signature.

RICHARD GREENLEAF TURNER.